United States Patent [19]
Huang

[11] Patent Number: 5,810,532
[45] Date of Patent: Sep. 22, 1998

[54] VEHICLE LUG NUT COVERS

[75] Inventor: Nan Huang, Rancho Palos Verdes, Calif.

[73] Assignee: Grand General Accessories Manufacturing Inc., Compton, Calif.

[21] Appl. No.: 853,827

[22] Filed: May 9, 1997

[51] Int. Cl.[6] ............................. F16B 33/00; F16B 37/14
[52] U.S. Cl. ......................... 411/431; 411/377; 411/910
[58] Field of Search .................................. 411/372, 373, 411/377, 429, 431, 910; 403/11, 23

[56] References Cited

U.S. PATENT DOCUMENTS

| | | |
|---|---|---|
| 4,576,533 | 3/1986 | Chartier . |
| 4,645,397 | 2/1987 | Howe .................................. 411/372 X |
| 4,907,929 | 3/1990 | Johnston, Jr. . |
| 5,082,409 | 1/1992 | Bias ........................................ 411/431 |
| 5,163,797 | 11/1992 | Patti . |
| 5,350,266 | 9/1994 | Espey et al. . |
| 5,364,213 | 11/1994 | Teramura . |

FOREIGN PATENT DOCUMENTS 2386722  11/1978  France .

*Primary Examiner*—Neill R. Wilson
*Attorney, Agent, or Firm*—Thomas I. Rozsa; Tony D. Chen; Jerry Fong

[57] ABSTRACT

A vehicle lug nut cover for covering, protecting and providing an ornamental decoration to a wheel lug nut of a vehicle. The nut cover has a shell with a closed portion and a plurality of sidewalls extending downwardly from the closed portion. The sidewalls define a generally hollow cavity and terminate in an outward extending flange rim adapted for adjoining a flat surface of a wheel rim when the lug nut cover is installed over a bolt and lug nut for mounting the wheel rim on a vehicle. The lug nut cover further comprises three leaf-springs for inserting into the hollow cavity of the shell. Each leaf-spring is adapted for engaging a side face of the wheel lug nut over which the lug nut cover is installed. The lug nut cover further comprises retaining members for retaining the three leaf-springs in its hollow cavity.

15 Claims, 2 Drawing Sheets

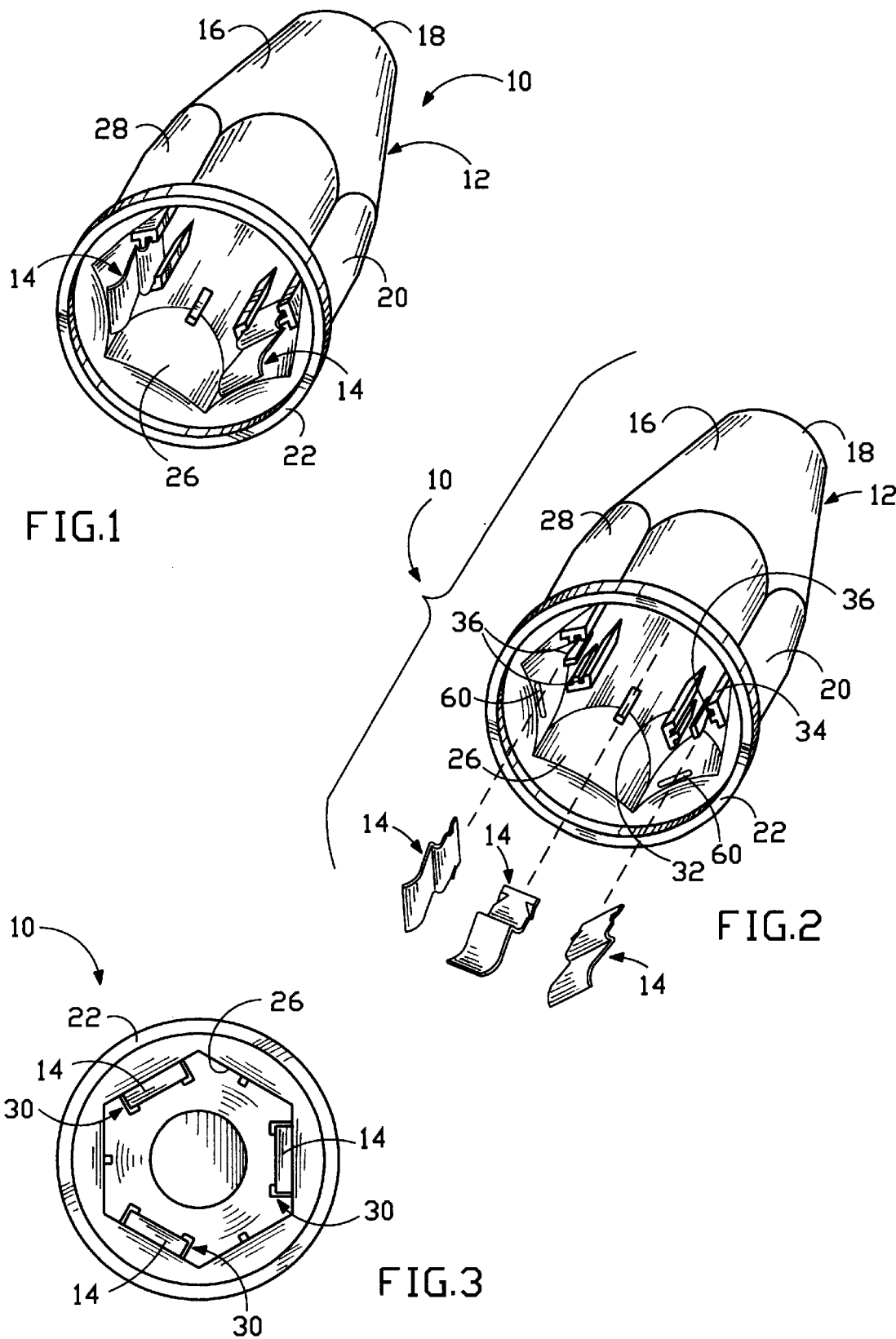

VEHICLE LUG NUT COVERS

BACKGROUND OF THE INVENTION

1. Field of the Invention

The present invention generally relates to the field of vehicle accessories. More particularly, the present invention relates to the field of ornamental wheel lug nut covers for covering and protecting lug nuts and bolts of vehicle wheels.

2. Description of the Prior Art

Generally, lug nut caps or covers are well known in the art. Many nut covers are designed to prevent damage, such as corrosion and dirt, of the wheel lug and its lug nut and also serves as a decorative or ornamental wheel cover to the vehicle wheel.

The following seven (7) prior art patents are found to be pertinent to the field of the present invention:

1. U.S. Pat. No. 4,576,533 issued to Chartier on Mar. 18, 1986 for "Attachment Cap For Fastener Head" (hereafter the "Chartier Patent");

2. U.S. Pat. No. 4,907,929 issued to Johnston, Jr. on Mar. 13, 1990 for "Bolt And Nut Cover" (hereafter the "Johnston Patent");

3. U.S. Pat. No. 5,082,409 issued to Bias on Jan. 21, 1992 for "Vehicular Lug Nut Cover And Clip" (hereafter the "Bias Patent");

4. U.S. Pat. No. 5,163,797 issued to Patti on Nov. 17, 1992 for "Vehicle Lug Nut Covers" (hereafter the "Patti Patent");

5. U.S. Pat. No. 5,350,266 issued to Espey et al. on Sep. 27, 1994 for "Plastic Capped Nut" (hereafter the "Espey Patent");

6. U.S. Pat. No. 5,364,213 issued to Teramura on Nov. 15, 1994 for "Cap For Fastening Devices For Motor Vehicle Wheels And The Like" (hereafter the "Teramura Patent"); and 7. French Patent No. 2,386,722 (hereafter the "'722 French Patent").

The Chartier Patent discloses an attachment cap for a fastener head. The cap has a hollow head portion and a cap attachment portion. The head portion has a top wall and an integral annular sidewall. The attachment portion has an annular channel which is formed in the inner wall of the cap adjacent the circumferential free edge for receiving in snap-fit engagement therein.

The Johnston Patent discloses a bolt and a nut cover. The nut cover comprises a body having an open end which is communication with an internal cavity. The internal cavity comprises a first section and a second section. The cover is forced over the bolt and the nut such that the first section surrounds the nut and the second section engages the threads of the bolt.

The Bias Patent discloses a vehicular lug nut cover and a clip. It comprises a shell which has a closed end portion and a plurality of side surfaces extending downwardly from the closed end portion. Each side surface of the shell has a planar inner wall that terminates in the bottom wall adapted for adjoining a flat surface of the wheel rim mounted on a vehicle. The clip is inserted into the cavity defined by the shell side surfaces. The clip comprises an annular ring and a plurality of spaced projections extending downwardly from the ring's perimeter. Each projection of the clip is adapted for engaging a side surface of the annular nut when the cover is installed.

The Patti Patent discloses vehicle lug nut covers. It comprises a lug nut cover which has a flange formed at the open end of the nut cover. An outer edge of the flange is turned under to capture the peripheral edge of a retainer ring. The retainer ring is a thin resilient member with a central opening formed with three or more equally spaced tabs that extend toward the center to form a circular opening for a lug bolt.

The Espey Patent discloses a plastic capped nut. The nut is adapted to receive a cap to provide a nut and cap assembly. The nut has six planar side faces and parallel end faces. The nut further has an axial opening with internal threads. Each side face of the nut has two opposed slots in axial alignment with one another and parallel to the central axis of the nut. The cap has six sidewalls formed at the lower portion and is adapted to receive the nut.

The Teramura Patent discloses a cap for fastening devices for motor vehicle wheels and the like. It comprises an inner cap member which is fittable over a hexagonal engageable portion of a nut and a top wall centrally formed with a threaded bore. A hollow cylinder outer cap member is fittable over the inner cap member and has a bolt hole formed in a top wall and corresponding to the threaded bore of the inner cap member. A bolt is screwed into the threaded bore through the bolt hole of the outer cap member.

The '722 French Patent discloses an automobile wheel decorative bolt cap. A bolt has a hexagonal head which is covered with the bolt cap. The internal shape of the cap matches the bolt head. The cap is retained by two diametrically opposite tongues which grip the tapered shoulder of the bolt.

It is highly desirable to have a very efficient and also very effective design and construction of a vehicle lug nut cover for providing protection and also serving as an ornamental cover for a wheel lug nut.

SUMMARY OF THE INVENTION

The present invention is a vehicle lug nut cover for covering, protecting and providing an ornamental decoration to a wheel lug nut of a vehicle. It comprises a shell having a closed portion and a plurality of sidewalls extending downwardly from the closed portion. The sidewalls define a generally hollow cavity and terminate in an outward extending flange rim adapted for adjoining a flat surface of a wheel rim when the lug nut cover is installed over a bolt and lug nut for mounting the wheel rim on a vehicle. The lug nut cover further comprises at least three leaf-spring means for inserting into the hollow cavity of the shell. Each leaf-spring means is adapted for engaging a side face of the wheel lug nut over which the present invention lug nut cover is installed. The lug nut cover further comprises means for retaining the at least three leaf-spring means in its hollow cavity.

It is an object of the present invention to provide a vehicle lug nut cover which can be easily, installed and removed. The lug nut cover requires no special tools, such as a hammer, screw or etc., to install over a wheel lug nut secured on a threaded bolt. In addition, the present invention vehicle lug nut cover does not require any specific puller to remove it from the wheel lug nut over which it is installed. The vehicle lug nut cover may be snap fitted over and removed from most any vehicle lug nut by hand.

It is also an object of the present invention to provide a vehicle lug nut cover that fits snugly against the sides of any lug nut over which it is installed so as to not dislodge under normal driving conditions. To achieve a snug fit, the present invention vehicle lug nut cover includes three spaced apart internal leaf-springs which are positioned within the hollow cavity of the shell and held therein by column means. These internal leaf-springs provide tension against side faces of the wheel lug nut, letting them hold tightly to the lug nut.

It is an additional object of the present invention to provide a vehicle lug nut cover which requires no contact with the bolt, especially, the bolt threads, over which the lug nut cover is installed. The securement means of the lug nut cover is not dependent upon gripping any portion of the bolt extending through the secured wheel lug nut.

It is a further object of the present invention to provide a vehicle lug nut cover which seats flush with a generally flat surface of a wheel rim when installed. The flush contact of the wheel rim inhibits dirt, road salt and other elements from getting beneath the vehicle lug nut cover and renders the bolt and lug nut therebeneath more susceptible to corrosion or other damage. Once installed, the present invention lug nut cover completely covers the bolt hole extending through the wheel rim for reducing the possibility of exposing any of the brake, steering and other wheel assembly parts over which the rim is mounted.

It is still another object of the present invention to provide a vehicle lug nut cover which includes a chrome-plated plastic, outer shell. The configuration of this shell is designed for easy manufacture through known injection molding processes. With an outer plating of chrome applied to the outer shell, wheel accessory maintenance has been simplified.

Further novel features and other objects of the present invention will become apparent from the following detailed description, discussion and the appended claims, taken in conjunction with the drawings.

BRIEF DESCRIPTION OF THE DRAWINGS

Referring particularly to the drawings for the purpose of illustration only and not limitation, there is illustrated:

FIG. 1 is a perspective view of a preferred embodiment of the present invention vehicle lug nut cover;

FIG. 2 is an exploded perspective view of the present invention lug nut cover, showing the three leaf-springs uninstalled;

FIG. 3 is a bottom plan view of the present invention lug nut cover, showing the three leaf-springs installed in the nut cover;

DESCRIPTION OF THE PREFERRED EMBODIMENT

Figure 4:
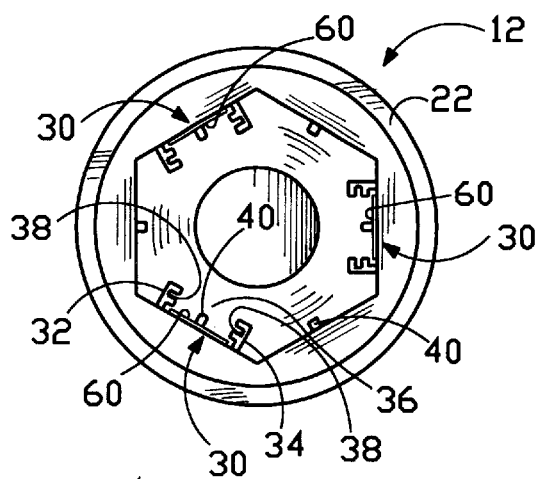
FIG. 4 is a bottom plan view of the present invention lug nut cover, showing none of the leaf-springs installed in the nut cover.

Although specific embodiments of the present invention will now be described with reference to the drawings, it should be understood that such embodiments are by way of example only and merely illustrative of but a small number of the many possible specific embodiments which can represent applications of the principles of the present invention. Various changes and modifications obvious to one skilled in the art to which the present invention pertains are deemed to be within the spirit, scope and contemplation of the present invention as further defined in the appended claims.

Referring to FIGS. 1, 2, 3, and 7, there is generally shown at 10 the present invention vehicle lug nut cover or cap which is comprised of an outer shell 12, three metal leaf-spring members 14 for inserting into shell 12, and retaining means 30 for retaining the leaf-spring members 14 within the outer shell 12. The lug nut cover 10 typically installs over an extended threaded portion 3 of a bolt 2 and its correspondingly threaded annular lug nut 4 (see FIG. 7). The lug nut 4 has a plurality of generally planar side faces 5.

Figure 7:
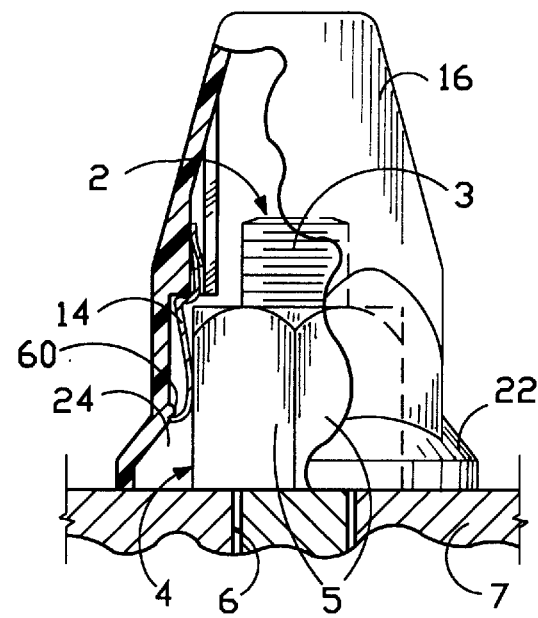
FIG. 7 is a side elevational view of the present invention lug nut cover with part of the nut cover cut away.

When the nut cover 10 is installed over the secured nut 4 and bolt 2, as shown in FIG. 7, the nut cover 10 substantially covers and minimizes any exposure of an aperture 6 in a wheel rim 7 through which the threaded portion of the bolt 2 passes. The outer shell 12 of the nut cover 10 is generally six-sided for fitting over the type of hexagonal lug nuts used to secure the wheel rim 7 on a vehicle, such as a truck, bus or etc.

It will be appreciated that the present invention is not limited to the six-sided configuration. It is emphasized that while the six-sided configuration is preferred, it is also within the spirit and scope of the present invention to have a lug nut cover for polygonal nuts which are other than six-sided. By way of example, the outer shell 12 of the lug nut cover 10 may be constructed with fours sides to cover a generally square shaped nut. By way of example, the outer shell 12 of the lug nut cover 10 may be an octagonal shell to cover a generally octagonal nut. The sidewalls of the outer shell 12 are also intended to be only slightly longer at their base than the length of each annular nut side face 5. Such an arrangement allows the inner faces on the sidewalls of the shell 12 to extend substantially parallel to, but not in contact with, the side faces 5 of nut 4 when the nut cover 10 is installed thereover.

The outer shell 12 comprises an upper hemispherical or dome-shaped portion 16 with a closed distal end 18, and a plurality of lower sidewalls 20 integrally formed with and extend downwardly from the dome-shaped portion 16 to form an open outward proximal extending flange rim 22. The extending flange rim 22 is preferably planar so that it may seat flush against a flat surface of the wheel rim 7 (see FIG. 7) when the nut cover 10 is installed over the nut 4 and the extended threaded portion 3 of bolt 2. The plurality of sidewalls 20 are integrally connected along adjacent lateral edges to define a generally hollow cavity 24. The cavity 24 and the dome-shaped portion 16 are designed to accommodate any extended threaded portion 3 of bolt 2, which extends outwardly beyond the lug nut 4, where the interior of the outer shell 12 does not require any contact with the extended threaded portion 3 of bolt 2 and the side faces 5 of the lug nut 4.

Each sidewall 20 of the outer shell 12 has an inner face 26 and an outer face 28. Each sidewall 20 is generally formed with upper and lower hemispherical shaped arches, where the inner and outer faces 26 and 28 of each sidewall 20 connect to a lower edge of the dome-shaped portion 16.

Referring to FIG. 4, there is depicted a bottom plan view of the present invention lug nut cover 10 without the leaf-spring members installed. There are depicted three retaining means 30 for retaining the leaf-spring members within the shell 12. The three retaining means 30 are substantially identical, and to the extent they are, only one will be described in detail. The retaining means 30 comprises an F-shaped column or post 32 and a backward F-shaped column or post 34 spaced apart and parallel to one another to form a slot 36 therebetween. Both of these columns 32 and 34 are integrally formed with the interior surface of the dome-shaped portion 16 and extend inwardly and axially from the closed distal end 18 of the dome-shaped portion 16 and respectively located above each one of the plurality of sidewalls 20 of the outer shell 12. Each of the columns 32 and 34 has an axial groove 38 facing one another. The outer shell 12 further comprises a ledge support 40 extending inwardly and axially from the dome-shaped portion 16 and located between two opposite columns 32 and 34. In addition, the sidewalls 20 that does not have the retaining means 30 thereon, also has the ledge support 40. The outer shell 12 also has three spaced apart lateral stoppers 60 respectively located on each one of the sidewalls 20 and adjacent to the outward proximal extending flange rim 22.

Figure 5:
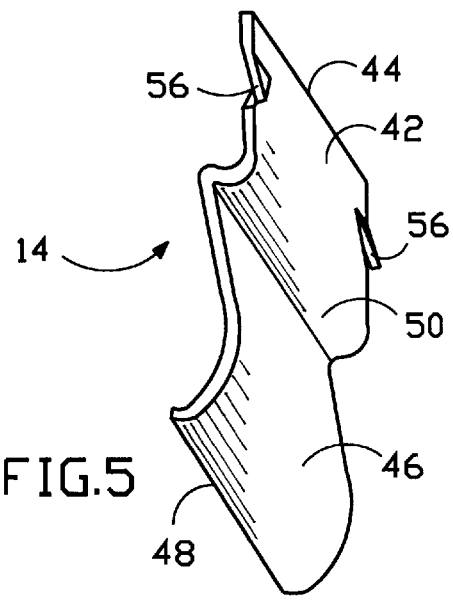
FIG. 5 is an enlarged perspective view of one of the leaf-springs of the present invention lug nut cover.
Figure 6:
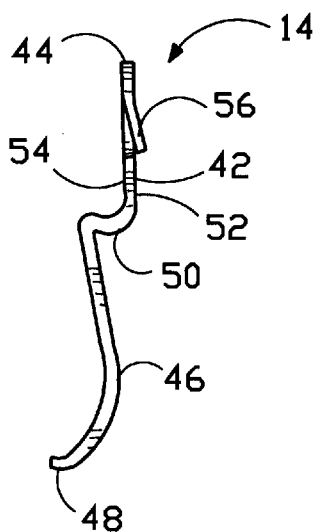
FIG. 6 is an enlarged side elevational view of one of the leaf-springs of the present invention lug nut cover.

Referring to FIGS. 5 and 6, there is depicted one of the three metal leaf-spring members 14 of the present invention vehicle lug nut cover. The leaf-spring members 14 are substantially identical, and to the extent they are, only one will be described in detail. The leaf-spring member 14 has an upper portion 42 with an upper end 44, a lower inward curved portion 46 with a bottom outwardly flange end 48, and a bend portion 50 connecting the upper portion 42 with the lower portion 46. The leaf-spring member 14 further has an interior side 52 and an exterior side 54. The upper portion 42 has two opposite notches or dents 56 extending away from the interior side 52. The upper end 44 of the upper portion 42 is respectively inserted into each one of the retaining means 30 such that side edges on the upper portion 42 of the leaf-spring member 14 slide within the axial grooves 38 of the two opposite columns 32 and 34. The upper portion 42 is secured thereto by the notches 56 which engage the two columns 32 and 34 while the bottom outwardly flange end 48 of the lower portion 46 respectively engages with each one of the stoppers 60 for preventing the leaf-spring members 14 from being installed incorrectly. The upper portion 42 is located on the dome-shaped portion 16 while the lower portion 46 is respectively located adjacent to each one of the inner face 26 of the plurality of sidewalls 20.

Referring to FIG. 7, the outer shell 12 of the lug nut cover 10 is installed by snapping over the wheel lug nut 4 such that the lower inward curved portion 46 of each leaf-spring member 14 correspondingly engages with the side face 5 of the wheel lug nut 4, where the lower inward curved portion 46 of the leaf-spring member 14 provides an inward force to the side face 5 of the wheel lug nut 4 to secure the shell 12 over the wheel lug nut 4 and the extended threaded portion 3 of the bolt 2.

The present invention conforms to conventional forms of manufacture or any other conventional way known to one skilled in the art. The manufacturing process which could accommodate the construction of the outer shell of the lug nut cover may be injection, thermoform, etc. or other molding process. By way of example, the outer shell of the lug nut cover can be made of plastic material and covered with a chrome plated material. By way of example, the leaf-springs can be made of any suitable material known to one skilled in the art.

Defined in detail, the present invention is a lug nut cover for covering a wheel lug nut of a vehicle which is used for mounting a wheel rim on the vehicle, the wheel lug nut having a plurality of generally planar side faces, the lug nut cover comprising: (a) a shell having a generally dome-shaped portion with a closed distal end, and a plurality of sidewalls integrally formed with and extending downwardly from the dome-shaped portion to form an outward proximal extending flange rim, the plurality of sidewalls defining a generally hollow cavity, each sidewall having an interior side face respectively corresponding to each one of the plurality of planar side faces of the wheel lug nut; (b) at least three pairs of opposite and parallel columns integrally formed with the dome-shaped portion and extending inwardly and axially from the closed distal end of the dome-shaped portion, each column having an axial groove facing one another to form a slot between each pair of columns; and (c) at least three metal leaf-springs each having an upper portion with an upper end, a lower inward curved portion with a bottom outwardly flange end, and a bend portion connecting the upper portion with the lower portion, each leaf-spring further having an interior side and an exterior side, the interior side having at least two opposite notches located on the upper portion, the upper end of the upper portion inserted into the slot of a respective pair of columns such that the at least two notches respectively engage with the respective pair of the columns for securing the upper portion of each metal leaf-spring therein, and the lower portion located adjacent to the interior side face of the plurality of sidewalls respectively; (d) whereby the shell is snapped over the wheel lug nut such that the lower inward curved portion of the each leaf-spring respectively engages with a respective one of the planar side faces of the wheel lug nut and provides a spring force to secure the shell over the wheel lug nut.

Defined broadly, the present invention is a lug nut cover for covering a wheel lug nut of a vehicle which is used for mounting a wheel rim on the vehicle, the wheel lug nut having a plurality of side faces, the lug nut cover comprising: (a) a shell having a dome-shaped portion with a closed distal end, and a plurality of sidewalls integrally formed with and extending downwardly from the dome-shaped portion to form a proximal flange rim, the plurality of sidewalls defining a hollow cavity; (b) at least two pairs of opposite and parallel posts integrally formed with the dome-shaped portion and extending inwardly and axially from the closed distal end of the dome-shaped portion, each post having an axial groove facing one another to form a slot between each pair of posts; and (c) at least two leaf-springs each having an upper portion and a lower inward curved portion, each leaf-spring further having an interior side and an exterior side, the interior side having retaining means located on the upper portion, the upper portion inserted into the slot respectively such that the retaining means engage with a respective pair of the posts for securing the upper portion of the each leaf-spring therein; (d) whereby the shell is snapped over the wheel lug nut such that the lower inward curved portion of the each leaf-spring respectively engages with a respective one of the side faces of the wheel lug nut and provides a spring force to secure the shell over the wheel lug nut.

Defined more broadly, the present invention is a nut cover for covering a wheel lug nut of a vehicle, comprising: (a) a shell having an upper closed end portion and a lower open end portion extending downwardly from the upper closed end portion to form a cavity; (b) at least two posts attached to the upper portion of the shell and extending inwardly and axially to form a slot therebetween; and (c) at least one spring means having retaining means, the at least one spring means inserted into the slot such that the retaining means engage with the at least two posts for securing a portion of the at least one spring means therein; (d) whereby the shell is snapped over the wheel lug nut such that the at least one spring means engages with the wheel lug nut and provides a spring force to secure the shell over the wheel lug nut.

Of course the present invention is not intended to be restricted to any particular form or arrangement, or any specific embodiment disclosed herein, or any specific use, since the same may be modified in various particulars or relations without departing from the spirit or scope of the claimed invention hereinabove shown and described of which the apparatus shown is intended only for illustration and for disclosure of an operative embodiment and not to show all of the various forms or modifications in which the present invention might be embodied or operated.

The present invention has been described in considerable detail in order to comply with the patent laws by providing full public disclosure of at least one of its forms. However, such detailed description is not intended in any way to limit the broad features or principles of the present invention, or the scope of patent monopoly to be granted.

What is claimed is:

1. A lug nut cover for covering a wheel lug nut of a vehicle which is used for mounting a wheel rim on the vehicle, the wheel lug nut having a plurality of generally planar side faces, the lug nut cover comprising:

a. a shell having a generally dome-shaped portion with a closed distal end, and a plurality of sidewalls integrally formed with and extending downwardly from the dome-shaped portion to form an outward proximal extending flange rim, the plurality of sidewalls defining a generally hollow cavity, each sidewall having an interior side face respectively corresponding to each one of the plurality of planar side faces of said wheel lug nut;

b. at least three pairs of opposite and parallel columns integrally formed with said dome-shaped portion and extending inwardly and axially from said closed distal end of said dome-shaped portion, each column having an axial groove facing one another to form a slot between each pair of columns; and c. at least three metal leaf-springs each having an upper portion with an upper end, a lower inward curved portion with a bottom outwardly flange end, and a bend portion connecting the upper portion with the lower portion, each leaf-spring further having an interior side and an exterior side, the interior side having at least two opposite notches located on the upper portion, the upper end of the upper portion inserted into said slot of a respective pair of columns such that the at least two notches respectively engage with the respective pair of said columns for securing the upper portion of each metal leaf-spring therein, and the lower portion located adjacent to said interior side face of said plurality of sidewalls respectively;

d. whereby said shell is snapped over said wheel lug nut such that said lower inward curved portion of said each leaf-spring respectively engages with a respective one of said planar side faces of said wheel lug nut and provides a spring force to secure said shell over said wheel lug nut.

2. The lug nut cover in accordance with claim 1 further comprising a ledge support extending inwardly and axially from said dome-shaped portion and respectively located between said respective pair of said columns.

3. The lug nut cover in accordance with claim 1 further comprising a lateral stopper for preventing said each leaf-spring from being further inserted into said slot respectively.

4. The lug nut cover in accordance with claim 1 wherein said shell is made out of plastic material.

5. The lug nut cover in accordance with claim 1 wherein said shell is covered with chrome plated material.

6. A lug nut cover for covering a wheel lug nut of a vehicle which is used for mounting a wheel rim on the vehicle, the wheel lug nut having a plurality of side faces, the lug nut cover comprising:

a. a shell having a dome-shaped portion with a closed distal end, and a plurality of sidewalls integrally formed with and extending downwardly from the dome-shaped portion to form a proximal flange rim, the plurality of sidewalls defining a hollow cavity;

b. at least two pairs of opposite and parallel posts integrally formed with said dome-shaped portion and extending inwardly and axially from said closed distal end of said dome-shaped portion, each post having an axial groove facing one another to form a slot between each pair of posts; and c. at least two leaf-springs each having an upper portion and a lower inward curved portion, each leaf-spring further having an interior side and an exterior side, the interior side having retaining means located on the upper portion, the upper portion inserted into said slot respectively such that the retaining means engage with a respective pair of said posts for securing the upper portion of the each leaf-spring therein;

d. whereby said shell is snapped over said wheel lug nut such that said lower inward curved portion of said each leaf-spring respectively engages with a respective one of said side faces of said wheel lug nut and provides a spring force to secure said shell over said wheel lug nut.

7. The lug nut cover in accordance with claim 6 further comprising a ledge support extending inwardly and axially from said dome-shaped portion and respectively located between said respective pair of said at least two pairs of posts.

8. The lug nut cover in accordance with claim 6 wherein said shell is made out of plastic material.

9. The lug nut cover in accordance with claim 6 wherein said shell is covered with chrome plated material.

10. The lug nut cover in accordance with claim 6 wherein said retaining means includes two opposite notches.

11. A nut cover for covering a wheel lug nut of a vehicle, comprising:

a. a shell having an upper closed end portion and a lower open end portion extending downwardly from the upper closed end portion to form a cavity;

b. at least two posts attached to said upper portion of said shell and extending inwardly and axially to form a slot therebetween; and c. at least one spring means having retaining means, the at least one spring means inserted into said slot such that the retaining means engage with said at least two posts for securing a portion of the at least one spring means therein;

d. whereby said shell is snapped over said wheel lug nut such that said at least one spring means engages with said wheel lug nut.

12. The nut cover in accordance with claim 11 further comprising a ledge support extending inwardly and axially from said upper closed end portion and located between said at least two posts.

13. The nut cover in accordance with claim 11 wherein said shell is made out of plastic material.

14. The nut cover in accordance with claim 11 wherein said shell is covered with chrome plated material.

15. The nut cover in accordance with claim 11 wherein said retaining means includes two opposite notches.

* * * * *